US012618440B2

(12) United States Patent  
Dahinten et al.

(10) Patent No.: US 12,618,440 B2  
(45) Date of Patent: May 5, 2026

(54) BEARING ASSEMBLY

(71) Applicant: AKTIEBOLAGET SKF, Gothenburg (SE)

(72) Inventors: Klaus Dahinten, Großbardorf (DE); Werner Schimmel, Waigolshausen (DE); Jesko-Henning Tanke, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 573 days.

(21) Appl. No.: 17/385,353

(22) Filed: Jul. 26, 2021

(65) Prior Publication Data

US 2022/0034365 A1 Feb. 3, 2022

(30) Foreign Application Priority Data

Jul. 31, 2020 (DE) .......................... 102020209677.5

(51) Int. Cl.  
*F16C 33/78* (2006.01)  
*F16J 15/3244* (2016.01)

(52) U.S. Cl.  
CPC ...... *F16C 33/7826* (2013.01); *F16C 33/7823* (2013.01); *F16J 15/3244* (2013.01); *F16C 33/7813* (2013.01); *F16C 33/7886* (2013.01)

(58) Field of Classification Search  
CPC ................ F16C 33/7813; F16C 33/782; F16C 33/7823; F16C 33/7826; F16C 33/7886; F16J 15/3244; F16J 15/787627  
See application file for complete search history.

(56) References Cited

U.S. PATENT DOCUMENTS

| | | | | |
|---|---|---|---|---|
| 3,259,393 A | * | 7/1966 | Dega | F16J 15/3244 |
| | | | | 277/560 |
| 3,515,395 A | * | 6/1970 | Weinand | F16J 15/3244 |
| | | | | 277/559 |
| 4,573,690 A | * | 3/1986 | DeHart | F16J 15/324 |
| | | | | 29/402.02 |
| 4,705,277 A | | 11/1987 | Repella | |
| 4,856,235 A | * | 8/1989 | Haynie | B24B 19/028 |
| | | | | 451/49 |

(Continued)

FOREIGN PATENT DOCUMENTS

| | | |
|---|---|---|
| CN | 87208956 U | 6/1988 |
| CN | 2795562 | 7/2006 |

(Continued)

OTHER PUBLICATIONS

Document titled "Zusatz zur Ladung für Aktenzeichen 10 2010 042 555.9" (English: "Addition to Summons for file No. 10 2010 042 555.9") from the German Patent Office dated Jun. 11, 2015, in related application DE 10 2010 042 555.9 and partial translation thereof.

*Primary Examiner* — Nicholas L Foster  
(74) *Attorney, Agent, or Firm* — J-TEK LAW PLLC; Scott T. Wakeman; Mark A. Ussai

(57) ABSTRACT

Disclosed is a bearing assembly, in particular a large bearing assembly, including at least one inner ring and at least one outer ring, between which at least one circumferential seal is disposed that slips on a circumferential slip surface of the inner ring or of the outer ring, wherein guide channels are formed on the slip surface or the circumferential seal.

6 Claims, 4 Drawing Sheets

(56)                References Cited

U.S. PATENT DOCUMENTS

| | | | | |
|---|---|---|---|---|
| 5,350,181 | A * | 9/1994 | Horve | F16J 15/3244 |
| | | | | 277/560 |
| 5,711,534 | A | 1/1998 | Bengoa et al. | |
| 6,170,834 | B1 * | 1/2001 | Vogt | F16J 15/3256 |
| | | | | 277/571 |
| 6,276,691 | B1 | 8/2001 | Nishigaki et al. | |
| 6,354,598 | B1 * | 3/2002 | Huang | F16J 15/3256 |
| | | | | 277/572 |
| 6,357,325 | B1 * | 3/2002 | Vogt | F16J 15/3256 |
| | | | | 82/1.11 |
| 8,313,106 | B2 | 11/2012 | Ting et al. | |
| 8,413,995 | B2 | 4/2013 | Matsui et al. | |
| 9,568,105 | B2 * | 2/2017 | Oshima | F16J 15/3244 |
| 9,664,288 | B2 * | 5/2017 | Ikeda | F16J 15/3244 |
| 10,190,637 | B2 * | 1/2019 | Inamasu | F16C 33/7856 |
| 10,267,422 | B2 * | 4/2019 | Yamaguchi | F16J 15/3244 |
| 11,215,284 | B2 * | 1/2022 | Ito | F16J 15/3204 |
| 2005/0134003 | A1 | 6/2005 | Bryde et al. | |
| 2007/0296153 | A1 | 12/2007 | Kurth et al. | |
| 2010/0109252 | A1 | 5/2010 | Matsui et al. | |
| 2010/0237567 | A1 | 9/2010 | Kurth et al. | |
| 2011/0109047 | A1 * | 5/2011 | Tones | F16J 15/3244 |
| | | | | 277/412 |
| 2012/0299250 | A1 | 11/2012 | Yamamoto et al. | |
| 2013/0264776 | A1 | 10/2013 | Kurth | |
| 2014/0175756 | A1 * | 6/2014 | Ikeda | F16J 15/162 |
| | | | | 277/552 |
| 2014/0353925 | A1 * | 12/2014 | Oshima | F16J 15/3244 |
| | | | | 277/552 |
| 2015/0014937 | A1 * | 1/2015 | Behrman | F16J 15/3204 |
| | | | | 277/351 |
| 2015/0300497 | A1 * | 10/2015 | Oshima | F16J 15/3244 |
| | | | | 277/559 |
| 2018/0023707 | A1 * | 1/2018 | Yamaguchi | F16J 15/3204 |
| | | | | 277/400 |
| 2018/0045247 | A1 * | 2/2018 | Inamasu | F16C 33/7856 |
| 2019/0277403 | A1 * | 9/2019 | Sakano | F16J 15/3256 |
| 2020/0011423 | A1 * | 1/2020 | Ito | F16J 15/3244 |
| 2020/0096112 | A1 * | 3/2020 | Ito | F16J 15/3204 |
| 2020/0124178 | A1 * | 4/2020 | Sakano | F16J 15/3284 |
| 2020/0166138 | A1 * | 5/2020 | Yonai | F16J 15/3252 |
| 2020/0278028 | A1 * | 9/2020 | Inoue | F16J 15/3456 |
| 2020/0340588 | A1 * | 10/2020 | Kasai | F16J 15/3264 |

FOREIGN PATENT DOCUMENTS

| | | | |
|---|---|---|---|
| CN | 1890495 | A | 1/2007 |
| CN | 107701591 | A * | 2/2018 |
| DE | 7220827 | U | 8/1972 |
| DE | 4443422 | A1 | 6/1996 |
| DE | 102007036625 | A1 | 2/2009 |
| DE | 102015213809 | A1 | 1/2017 |
| EP | 1628052 | A2 | 2/2006 |
| EP | 1998088 | A1 | 12/2008 |
| JP | H0329768 | U | 3/1991 |
| JP | 2005201313 | A | 7/2005 |
| WO | 20110062153 | A1 | 5/2011 |

* cited by examiner

BEARING ASSEMBLY

CROSS-REFERENCE

This application claims priority to German patent application no. 10 2020 209 677.5 filed on Jul. 31, 2020, the contents of which are fully incorporated herein by reference.

TECHNOLOGICAL FIELD

The present disclosure relates to a bearing assembly configured for improved sealing.

BACKGROUND

In bearing assemblies, for example, in large bearings, seals are used in order to seal the bearing inwardly and outwardly. In this way, for example, a leakage of lubricant can be prevented. In order to achieve a good seal tightness, a slip surface of the seal, i.e., a surface of the inner or outer ring on which the seal or a seal lip of the seal slips, is processed to make it as smooth as possible, for example, by grinding.

With large bearing diameters, weight-optimized housings are often used that lead to an elasticity of the entire system. This elasticity can lead to deformations of the entire system and thus to deformations of the seal, which deformations result in a serpentine contact path between the seal and the slip surface. Deformations of the seal in the contact region of the seal to the slip surface can thus arise that are locally larger than the bearing experiences on average. These deformations can be relatively long due to the large seal diameter and reduce the sealing capacity of the seal.

SUMMARY

It is therefore an aspect of the present disclosure to provide a bearing assembly that compensates for reductions of seal capacity caused by deformations.

The disclosed bearing assembly includes at least one inner ring and at least one outer ring, between which at least one circumferential seal is disposed that slips on a circumferential slip surface of the inner ring or the outer ring. The bearing assembly can in particular be a large bearing assembly having an outer diameter of more than 2 m, in particular more than 4 m. The bearing assembly can be configured as a rolling-element bearing, for example, as a ball bearing or roller bearing, but also as a plain bearing.

As explained above, the sealing ability can be reduced by the deformation of the seal. In order to compensate for this reduced sealing ability, according to the bearing assembly proposed here it is provided to actively pump, inwardly or outwardly, a medium to be sealed against that could move through the seal due to the reduced sealing capacity. For this purpose, in the bearing assembly proposed here guide channels, in particular having constant, controlled orientation, are formed on the slip surface of the bearing ring. Alternatively in the bearing assembly proposed here, guide channels, in particular having constant, controlled orientation, are formed on the circumferential seal, preferably on a circumferential seal lip of the bearing assembly.

In contrast to known slip surfaces, which are formed as smooth as possible in order to minimize the wear of the slipping seal lip, here controlled guide channels are introduced into the slip surface. Due to these guide channels, it can be achieved that the medium to be sealed against is pumped inward or outward, depending on the desired seal effect in the bearing assembly. Here the guide channels have a magnitude that exceeds the local deformations of the seal, or of a seal lip of the seal, and in operation thus generates a pumping effect relative to the seal lip.

The medium to be sealed against can be a lubricant that is pumped through the guide channels into the bearing interior. Alternatively, for example, water, but also superfluous lubricant, can be pumped out from the bearing interior through the guide channels. The direction of the pumping effect can be changed by a changing of the rotational direction of the bearing assembly.

The guide channels can be configured as a plurality of recesses in the slip surface. Alternatively the guide channels can be defined by spaces between ribs that are formed on the slip surface. Depending on the requirement, the guide channels and their pitch can be configured with different widths or slopes, wherein preferably the width of the guide channels is constant over the circumference of the slip surface. The guide channels can be configured as a plurality of recesses in the circumferential seal. Alternatively a seal lip can have a constant pitch circumferentially, and thus, in the manner of a thread of a screw, a circumferential screw-like recess between the circumferential passages of the seal lip. Thus the guide channels are formed having constant pitch between the circumferential seal lips. Alternatively a plurality of seal lips can also be formed circumferentially in the manner of a multiply threaded screw, and guide channels form between them.

The guide channels are preferably distributed uniformly circumferentially. Due to the uniform distribution, the desired constant pitch can be ensured over the entire slip surface of the seal.

According to a further embodiment, the guide channels have a separation defining the pitch of greater than or equal to 0.5 mm, in particular greater than or equal to 1 mm, and preferably greater than or equal to 4 mm per rotation. Here the separation of a guide channel defines the offset of the guide channel in the circumferential direction.

As already explained above, in operation due to a large deformation of the entire structure, for example, of a turbine structure in use in a wind turbine, locally different angular misalignments of the seal lips can result. In these cases the seal effect between the seal and the slip surface is reduced locally in the short term. This can be compensated for by the particularly high separation of the guide channels, as is provided here.

The angular misalignments of the seal lip lead to an elastic deformation of the seal lip, which in turn leads to a wave shape of the seal lip on the slip surface. The division of the guide channels, which division produces the pitch, is chosen such that it is larger than the largest usually occurring pitches of the wave shape of the seal lip. It can thus be ensured that the pitch of the wave shape of the seal lip and the pitch of the guide channels do not match, and thus the seal lip does not extend in a guide channel. The desired pumping effect is thus ensured over the entire seal diameter, since the guide channels are not blocked by the seal lip.

A distance between the guide channels can in particular be smaller than the division. This has the advantage that a particularly finely structured surface is thereby achieved. It can thereby be ensured that a plurality of guide channels producing the pumping effect are always provided below the seal lip on the slip surface. A distance between the guide channels is preferably less than or equal to 0.1 mm.

According to a further embodiment, the slip surface has a surface roughness Ra that is less than or equal to 0.4 μm, in particular less than or equal to 0.2 μm, preferably less than or equal to 0.1 μm. Due to this surface roughness, the guide channels form a very smooth slip surface for the seal, which ensures the desired low seal wear. In comparison to conventional smooth slip surfaces, the friction of the seal is thereby not substantially increased, and thus the wear is not increased.

The slip surface can be a radial surface, a planar axial surface, or an oblique surface. Depending on the seal used, a corresponding slip surface can thus be equipped with guide channels.

According to a further embodiment, two circumferential seals are disposed between the inner ring and the outer ring, which seals each slip on a circumferential slip surface. For example, a corresponding seal having a corresponding slip surface can be provided on both axial sides of the bearing assembly. The two slip surfaces can preferably include opposing obliquely oriented guide channels such that, depending on the rotational direction of the bearing assembly, there is an inward or outward pumping effect.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
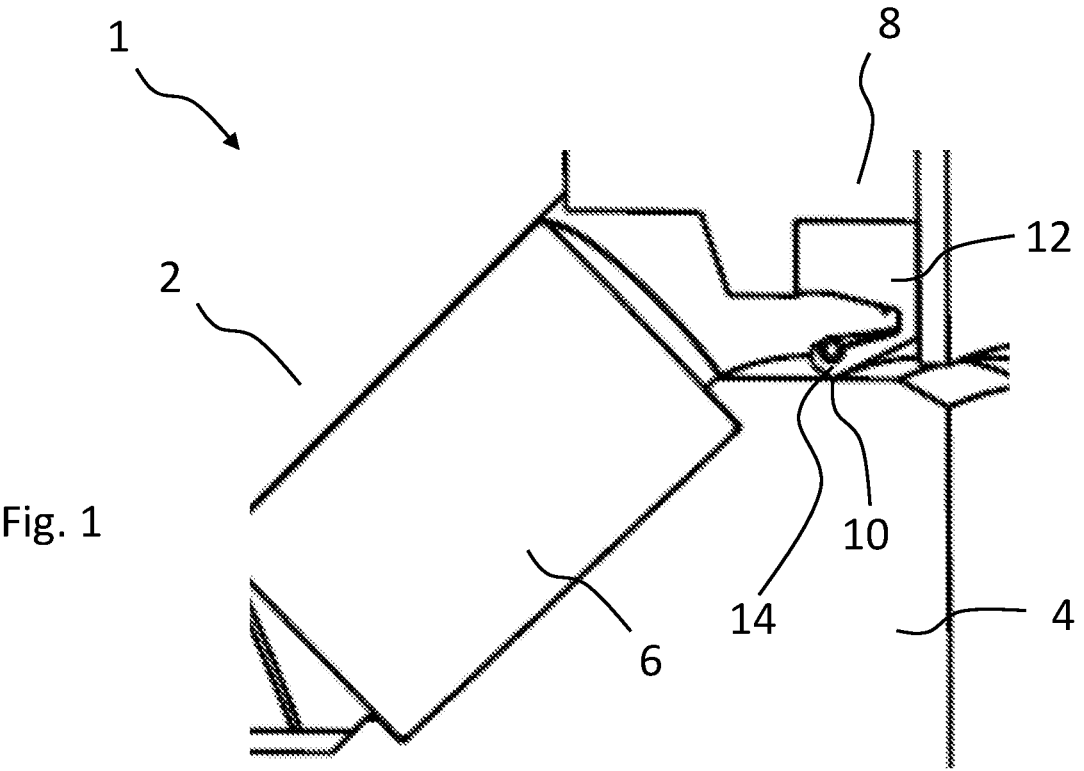
FIG. 1 is a sectional view of a bearing assembly including a seal.

FIG. 1 shows a section of a bearing assembly 1 including at least one inner ring 2 and at least one outer ring 4. Rolling elements 6, in this case rollers, are disposed between the rings 2, 4. The rolling elements 6 can also be balls, spherical rollers, or the like. Alternatively the bearing assembly 1 can also be a plain bearing. The bearing assembly 1 is in particular a large bearing for a wind turbine main shaft or similar, having an outer diameter of more than 2 m.

In order to seal the bearing assembly 1, a seal 12 is provided that is, for example, attached to a housing 8. The seal 12 includes a seal lip 14 that slips on a slip surface 10 of the inner ring 2. Alternatively the seal 12 can also be attached to the inner ring 4, and in this case the seal lip 14 slips on a slip surface that is provided on the outer ring 2.

In the example shown in FIG. 1, the slip surface 10 is a cylindrical surface. Alternatively the slip surface 10 can be a planar, annular side surface or a generally conical surface.

The seal 12 is respectively disposed so that the seal lip 14 slips on the corresponding slip surface 10.

The rotating part of the bearing assembly 1 can either be the part that includes the slip surface 10 or the part that holds the seal 12. The seal slip surface 10 can thus be disposed on a rotating outer ring 2 or a rotating inner ring 4 in the bearing assembly 1.

Figure 2:
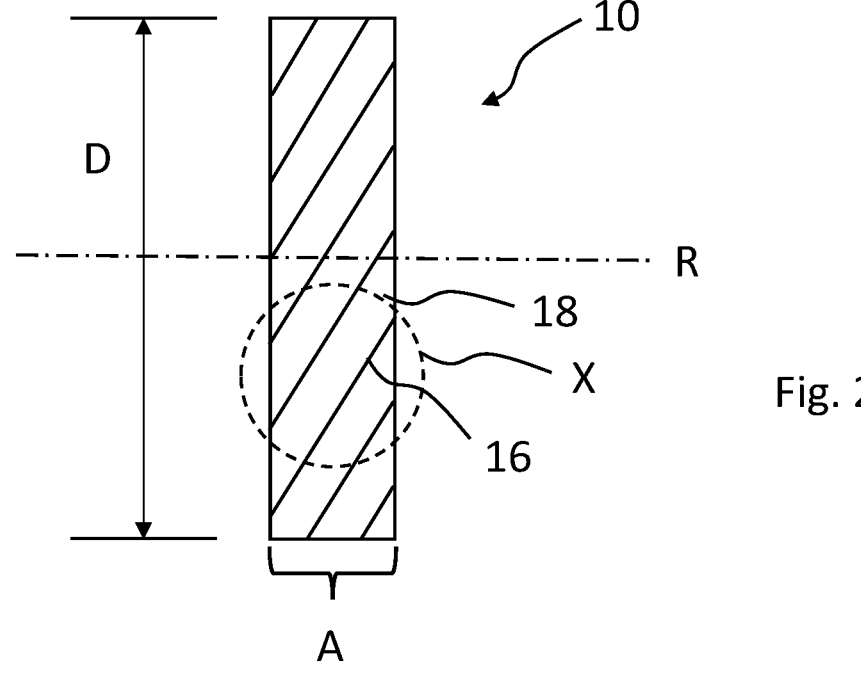
FIG. 2 is a plan view of a section of the slip surface for the seal of the bearing assembly of FIG. 1.

FIG. 2 shows a plan view of a section of the slip surface 10. The slip surface 10 includes guide channels 18. The guide channels 18 can be provided as recesses in the slip surface 10 or can be provided as the gaps between rib-shaped surface textures 16. The showing of FIG. 2 could also represent the appearance of guide channels in the seal lip.

As is shown in FIG. 2, the guide channels 18 extend obliquely to the axis of rotation R. The slip surface 10 has a diameter D and a surface area A. The slip surface 10 rotates about the axis of rotation R. Due to the slanted position of the guide channels 18 with respect to the axis of rotation R, a pumping effect can be achieved on the one or the other side of the slip surface 10. Depending on the rotational direction of the bearing assembly 1, the medium to be sealed against is thus pumped into a bearing intermediate space or pumped out of the bearing assembly 1.

In comparison to previous slip surfaces that usually do not have surface textures, a slip surface 10 is provided here that makes possible guide channels 18 having a high pitch angle for the targeted pumping of media to be sealed against toward the bearing intermediate space or out of the bearing 1. Due to the guide channels 18, a better control of the medium to be sealed against can thus be achieved.

Figure 3:
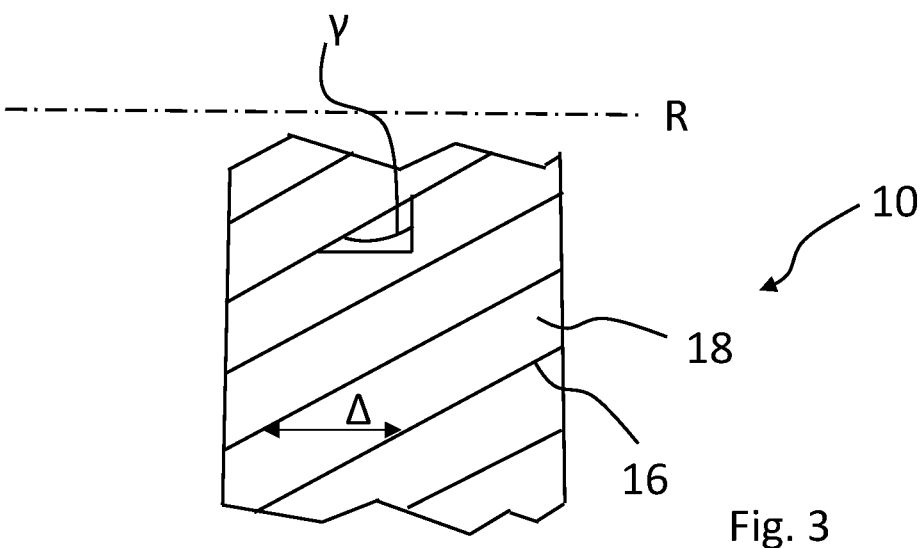
FIG. 3 is an enlarged view of the region X of FIG. 2.
Figure 6:
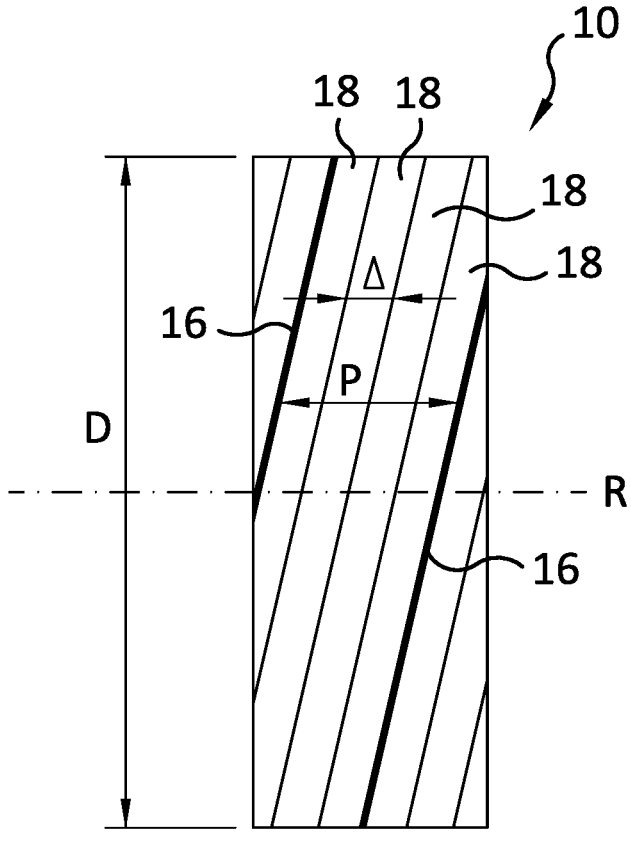
FIG. 6 is a plan view of a section of an alternate slip surface of the bearing.

FIG. 3 shows an enlarged region X of FIG. 2. The rib-shaped structures 16 or the guide channels 18 are uniformly distributed over the circumference of the slip surface 10. A distance A between two ribs 16 is thus constant over the circumference of the slip surface 10. Furthermore, a pitch angle γ, which indicates a slope of the ribs 16 or of the guide channels 18 in the circumferential direction, is also constant over the circumference of the slip surface 10. With reference to FIGS. 2 and 6, the pitch angle γ can be calculated from the pitch P of the guide channels 18 and the seal surface diameter D as:

$$\gamma = \arctan(P/D).$$

The pitch of the ribs 16 is preferably larger than the distance Δ between the guide channels 18.

Figure 4:
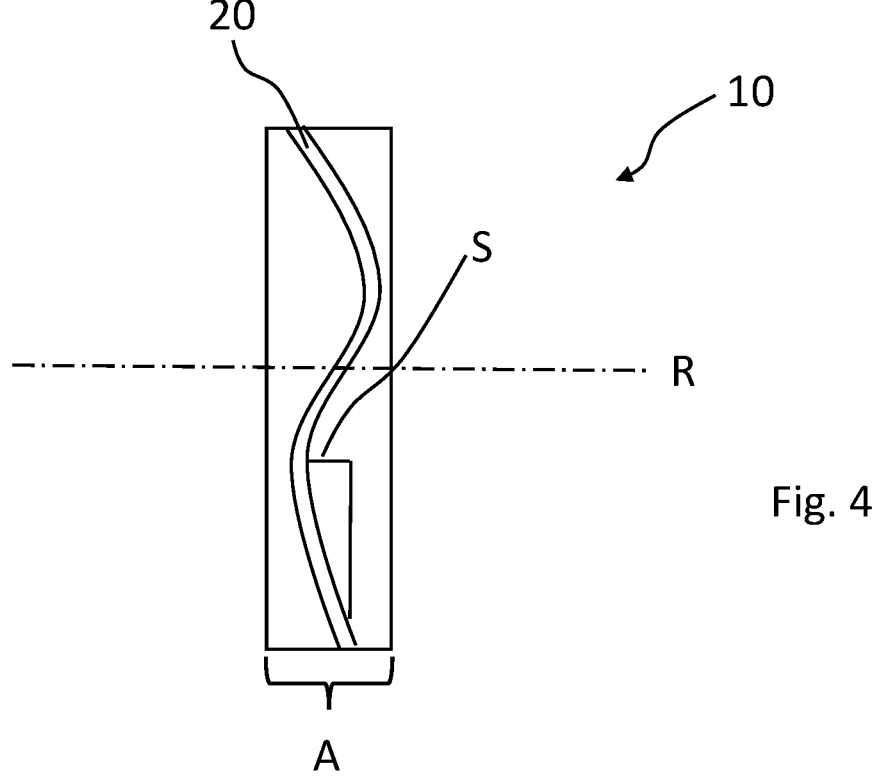
FIG. 4 is a plan view of a section of the slip surface including a track or path of the seal.

FIG. 4 shows a section of the slip surface 10 including a seal track 20. Here the track of the seal lip 14 of the seal 12, which is deformed during operation, is depicted on the slip surface 10. The seal track 20 is a curved line that is generated by alignment tolerances and mainly by an elastic deformation of the entire application under external mechanical loads and deformations.

The slope angle γ of the guide channels 18 is chosen such that the slope of the guide channels 18 is larger than the largest normally occurring slopes S of the wave shape 20 of the seal lip 14. It can thus be ensured that the slope S and the slope of the guide channels 18 do not match, and thus seal lip 14 does not extend in a guide channel 18.

Despite the curved seal track 20, due to the guide channels 18 and the ribs 16, a pumping effect is always ensured between the slip surface 10 and the seal 12 over the circumference of the slip surface 10.

Figure 5:
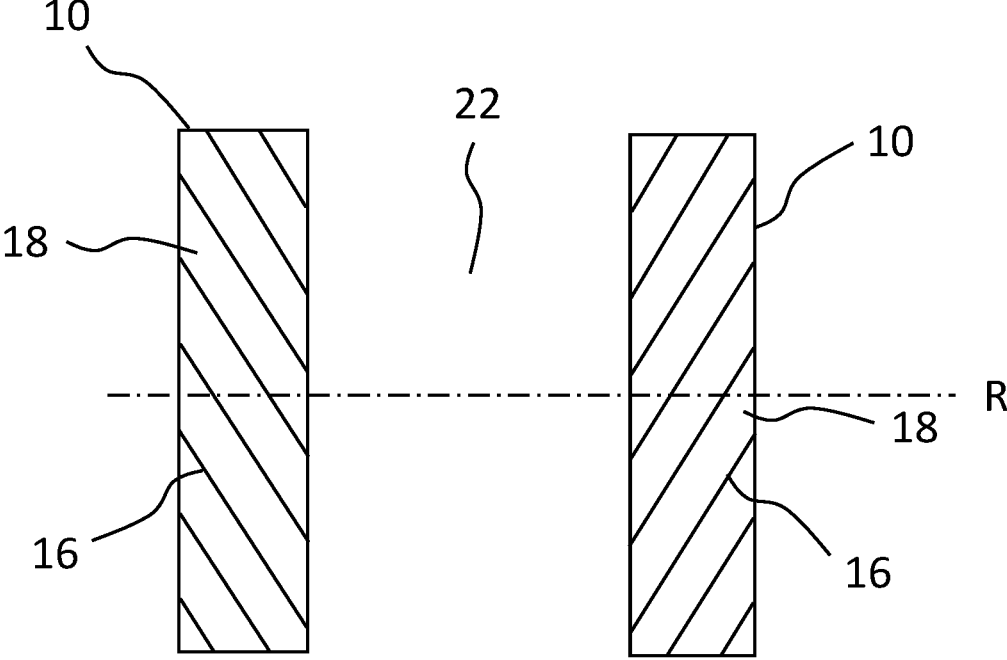
FIG. 5 is a plan view of a section of a bearing assembly including two slip surfaces.

As is shown in FIG. 5, slip surfaces 10 can be provided on both axial or radial ends of the bearing assembly 1., The bearing intermediate space 22, located between the two slip surfaces 10, is filled with lubricant.

Due to the opposing arrangement of the ribs 16 or of the guide channels 18, an inward pumping effect, for example, into the bearing intermediate space 22, is achieved in order to seal the bearing interior against the loss of lubricant. In this way lubricant that is pressed outward by a rotation of the bearing assembly 1 can be pumped back into the bearing intermediate space 22 by the guide channels 18. Alternatively another medium, for example, water, but also superfluous lubricant, can be pumped out of the bearing intermediate space 22 by the guide channels 18. The direction of the pumping effect can be changed by a changing of the rotational direction of the bearing assembly 1.

In summary, due to the guide channels provided with a controlled, particularly large separation or pitch, an improved seal effect of the bearing assembly is achieved by the bearing assembly proposed here.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Outer ring
4 Inner ring
6 Rolling element
8 Housing
10 Slip surface
12 Seal
14 Seal lip
16 Rib
18 Guide channels
20 Seal track
22 Bearing intermediate space
A Surface of the slip surface
D Diameter of the slip surface
Δ Distance between ribs
γ Pitch angle of the guide channels R Axis of rotation
S Pitch of the seal wave shape
X Enlarged region

The invention claimed is:

1. A large bearing assembly comprising:
at least one first bearing ring,
at least one second bearing ring having a first slip surface, and
a first seal having a seal lip, the first seal being mounted to the at least one first bearing ring with the seal lip in contact with the first slip surface,
wherein the first slip surface includes guide channels,
wherein the guide channels have a pitch of greater than or equal to 4 mm per rotation,
wherein a circumferential distance between the guide channels is smaller than the pitch,
wherein the at least one second bearing ring includes a second slip surface configured to be contacted by a seal lip of a second seal,
wherein the second slip surface includes guide channels, and
wherein the guide channels in the first slip surface are oriented oppositely to the guide channels in the second slip surface.

2. A large bearing assembly comprising:
at least one first bearing ring,
at least one second bearing ring having a first slip surface, and
a first seal having a seal lip, the first seal being mounted to the at least one first bearing ring with the seal lip in contact with the first slip surface,
wherein the first slip surface includes guide channels, and
wherein a circumferential distance between the guide channels is smaller than a pitch of the guide channels, and the circumferential distance between the guide channels is less than or equal to 0.1 mm.

3. A large bearing assembly comprising:
at least one first bearing ring,
at least one second bearing ring having a first slip surface, and
a first seal having a seal lip, the first seal being mounted to the at least one first bearing ring with the seal lip in contact with the first slip surface,
wherein the first slip surface includes guide channels,
wherein a circumferential distance between the guide channels is smaller than a pitch of the guide channels, and
wherein the first slip surface has a surface roughness that is less than or equal to 0.1 μm.

4. A large bearing assembly comprising:
at least one first bearing ring,
at least one second bearing ring having a first slip surface, and
a first seal having a seal lip, the first seal being mounted to the at least one first bearing ring with the seal lip in contact with the first slip surface,
wherein the first slip surface includes guide channels,
wherein a circumferential distance between the guide channels is smaller than a pitch of the guide channels,
wherein the at least one second bearing ring includes a second slip surface configured to be contacted by a seal lip of a second seal,
wherein the second slip surface includes guide channels, and
wherein the guide channels in the first slip surface are oriented oppositely to the guide channels in the second slip surface.

5. A large bearing assembly comprising:

at least one first bearing ring, at least one second bearing ring having a first slip surface, and a first seal having a seal lip, the first seal being mounted to the at least one first bearing ring with the seal lip in contact with the first slip surface, wherein the first slip surface includes guide channels, wherein a circumferential distance between the guide channels is smaller than a pitch of the guide channels, and wherein at least one of the guide channels extends at least 360 degrees around the at least one second bearing ring.

6. A large bearing assembly comprising:

at least one first bearing ring, at least one second bearing ring having a first slip surface, and a first seal having a seal lip, the first seal being mounted to the at least one first bearing ring with the seal lip in contact with the first slip surface, wherein the first slip surface includes guide channels, wherein a circumferential distance between the guide channels is smaller than a pitch of the guide channels, and wherein one of the guide channels is partially defined by a rib, and wherein the rib extends at least 360 degrees around the at least one second bearing ring.

\* \* \* \* \*